(12) United States Patent
Boston

(10) Patent No.: US 9,630,129 B2
(45) Date of Patent: Apr. 25, 2017

(54) FLUID FILTER AND RELIEF VALVE ASSEMBLY

(71) Applicant: West Troy, LLC, Troy, OH (US)

(72) Inventor: Sean M. Boston, Arcanum, OH (US)

(73) Assignee: West Troy, LLC, Troy, OH (US)

( * ) Notice: Subject to any disclaimer, the term of this patent is extended or adjusted under 35 U.S.C. 154(b) by 0 days.

(21) Appl. No.: 15/193,809

(22) Filed: Jun. 27, 2016

(65) Prior Publication Data

US 2016/0303497 A1 Oct. 20, 2016

Related U.S. Application Data

(63) Continuation-in-part of application No. 14/719,778, filed on May 22, 2015, which is a continuation-in-part
(Continued)

(51) Int. Cl.
*B01D 35/147* (2006.01)
*F16K 17/04* (2006.01)
(Continued)

(52) U.S. Cl.
CPC ....... *B01D 35/1475* (2013.01); *B01D 27/103* (2013.01); *B01D 27/106* (2013.01);
(Continued)

(58) Field of Classification Search
CPC ... F16K 17/406; F16L 55/1007; F16L 55/005; Y10T 137/87957; Y10T 137/6525; Y10T 137/1654
(Continued)

(56) References Cited

U.S. PATENT DOCUMENTS 758,377 A 4/1904 Miller
2,564,023 A 8/1952 Miller
(Continued)

FOREIGN PATENT DOCUMENTS

GB 2100140 A 12/1982
JP 09-133233 5/1997
(Continued)

OTHER PUBLICATIONS

U.S. Office Action dated Jul. 18, 2016 pertaining to U.S. Appl. No. 14/719,778.
(Continued)

*Primary Examiner* — Kevin Lee
*Assistant Examiner* — P. Macade Nichols
(74) *Attorney, Agent, or Firm* — Dinsmore & Shohl LLP

(57) ABSTRACT

Fluid filters and modular relief valve assemblies for use therein are provided where the modular relief valve assembly comprises a bypass housing, a bypass spring, a valve plug, and a locator spring. The locator spring is at least partially seated within and modularly joined to a trailing portion of the bypass housing. The bypass spring and the valve plug are modularly joined to the bypass housing. The trailing portion of the bypass housing comprises at least one annular forward-facing seating surface. The leading portion of the bypass housing comprises a sealing extension, an intermediate reducing taper, and a valve plug sealing surface. The sealing extension is positioned between the forward-facing seating surface and the intermediate reducing taper. The intermediate reducing taper is positioned between the sealing extension and the valve plug sealing surface and reduces towards the valve plug sealing surface.

24 Claims, 4 Drawing Sheets

Related U.S. Application Data of application No. 14/209,112, filed on Mar. 13, 2014.

(60) Provisional application No. 61/802,553, filed on Mar. 16, 2013.

(51) Int. Cl.
*F16K 27/02* (2006.01)
*B01D 27/10* (2006.01)
*F16K 15/06* (2006.01)

(52) U.S. Cl.
CPC ............ *F16K 15/063* (2013.01); *F16K 17/04* (2013.01); *F16K 27/0209* (2013.01); *Y10T 137/7922* (2015.04)

(58) Field of Classification Search
USPC ........................................................ 137/535
See application file for complete search history.

(56) References Cited

U.S. PATENT DOCUMENTS

| | | | |
|---|---|---|---|
| 2,870,579 A | 1/1959 | Parker | |
| 3,132,097 A | 5/1964 | Tietz | |
| 3,224,591 A | 12/1965 | Sawyer | |
| 3,263,701 A | 8/1966 | Johnson | |
| 3,335,751 A | 8/1967 | Davis, Jr. | |
| 3,411,632 A | 11/1968 | Offer et al. | |
| 3,599,792 A * | 8/1971 | Stripp | B01D 35/005 210/130 |
| 3,616,933 A | 11/1971 | Baldwin | |
| 3,794,170 A | 2/1974 | Yamaguchi | |
| 3,807,561 A | 4/1974 | Cullis | |
| 4,045,349 A | 8/1977 | Humbert, Jr. | |
| 4,075,097 A | 2/1978 | Paul | |
| 4,129,144 A | 12/1978 | Andersson et al. | |
| 4,168,237 A | 9/1979 | Pickett et al. | |
| 4,314,903 A | 2/1982 | Hanley | |
| 4,400,864 A | 8/1983 | Peyton et al. | |
| 4,421,444 A | 12/1983 | Hanley | |
| 4,473,471 A | 9/1984 | Robichaud et al. | |
| 4,935,127 A | 6/1990 | Lowsky et al. | |
| 4,990,247 A | 2/1991 | Vandenberk | |
| 5,250,176 A | 10/1993 | Daniel | |
| 5,362,390 A | 11/1994 | Widenhoefer et al. | |
| 5,374,355 A | 12/1994 | Habiger et al. | |
| 5,490,930 A | 2/1996 | Krull | |
| 6,202,859 B1 | 3/2001 | Langsdorf et al. | |
| 6,284,130 B1 | 9/2001 | Daniel | |
| 6,345,721 B1 | 2/2002 | Durre et al. | |
| 6,349,836 B1 | 2/2002 | Langsdorf et al. | |
| 6,468,425 B2 | 10/2002 | Reinhart | |
| 6,595,372 B1 | 7/2003 | Minowa et al. | |
| 6,610,203 B1 | 8/2003 | Jainek | |
| 6,615,989 B2 | 9/2003 | Brown et al. | |
| 7,934,617 B2 | 5/2011 | Minowa et al. | |
| 8,685,243 B2 | 4/2014 | Bilski et al. | |
| 8,757,200 B2 | 6/2014 | Davidson et al. | |
| 2002/0011435 A1 | 1/2002 | Koltunov | |
| 2002/0030007 A1 | 3/2002 | Koh | |
| 2003/0015240 A1 | 1/2003 | Nelson et al. | |
| 2005/0103386 A1 | 5/2005 | Magda | |
| 2006/0137316 A1 | 6/2006 | Krull et al. | |
| 2006/0201559 A1 | 9/2006 | Ege et al. | |
| 2010/0108589 A1 | 5/2010 | Frye et al. | |

FOREIGN PATENT DOCUMENTS

| | | |
|---|---|---|
| WO | 9511072 A1 | 4/1995 |
| WO | 2010062666 A2 | 6/2010 |

OTHER PUBLICATIONS

Search Report pertaining to International Application No. PCT/US2011/048363 dated Mar. 21, 2012.

\* cited by examiner

FLUID FILTER AND RELIEF VALVE ASSEMBLY

CROSS-REFERENCE TO RELATED APPLICATIONS

This application is a continuation-in-part of U.S. patent application Ser. No. 14/719,778, filed May 22, 2015, and entitled "FLUID FILTER AND RELIEF VALVE ASSEMBLY" which is a continuation-in-part of U.S. patent application Ser. No. 14/209,112, filed Mar. 13, 2014, and entitled "COIL SPRING/RELIEF VALVE ASSEMBLY FOR AN OIL FILTER," which claims the benefit of U.S. Provisional Application Ser. No. 61/802,553, filed Mar. 16, 2013, and entitled "COIL SPRING/RELIEF VALVE ASSEMBLY FOR AN OIL FILTER."

BACKGROUND

The present invention relates to fluid filter assemblies and, more particularly, to relief valves used therein.

BRIEF SUMMARY

According to the subject matter of the present disclosure, a fluid filter and relief valve assembly are provided to address particular challenges associated with the incorporation and use of relief valve assemblies in fluid filters. Specifically, the present inventors have recognized that relief valve assemblies are difficult to handle and install, and often necessitate high cost design elements to guard against leakage or other malfunctions. In accordance with one embodiment, the subject matter of the present disclosure addresses these challenges by providing a fluid filter comprising a filter canister, a fluid inlet, a fluid outlet, filter media, and a modular relief valve assembly.

The filter media defines a seated end, a bypass end, an outer filtering zone, and an inner fluid passage. The inner fluid passage of the filter media extends from the seated end to the bypass end of the filter media. The filter media is disposed in a fluid path within the filter canister between the fluid inlet and the fluid outlet. The modular relief valve assembly is positioned inside the filter canister and comprises a bypass housing, a bypass spring, a valve plug, and a locator spring. The locator spring is at least partially seated within and modularly joined to a trailing portion of the bypass housing. The bypass spring and the valve plug are modularly joined to the bypass housing and are configured such that the valve plug moves to an open position when a bypass fluid pressure on the valve plug exceeds a bypass threshold of the bypass spring. The trailing portion of the bypass housing comprises at least one annular forward-facing seating surface in contact with the bypass end of the filter media. A leading portion of the bypass housing extends into the inner fluid passage of the filter media from the bypass end of the filter media and comprises a sealing extension, an intermediate reducing taper, and a valve plug sealing surface. The sealing extension of the leading portion is positioned between the forward-facing seating surface of the trailing portion and the intermediate reducing taper of the leading portion. The intermediate reducing taper of the leading portion is positioned between the sealing extension and the valve plug sealing surface of the leading portion and reduces towards the valve plug sealing surface of the leading portion. The locator spring is compressed between the bypass housing and a bypass end of the filter canister such that, given the configuration of the bypass housing and the filter media, the trailing portion of the bypass housing forcibly engages the bypass end of the filter media. An outer cylindrical portion of the sealing extension forcibly engages an inner cylindrical portion of the filter media along the inner fluid passage of the filter media. The seated end of the filter media forcibly engages an outlet end of the filter canister.

In accordance with another embodiment of the present disclosure, a modular relief valve assembly is provided comprising a bypass housing, a bypass spring, a valve plug, and a locator spring. The locator spring is at least partially seated within and modularly joined to a trailing portion of the bypass housing. The bypass spring and the valve plug are modularly joined to the bypass housing and are configured such that the valve plug moves to an open position when a bypass fluid pressure on the valve plug exceeds a bypass threshold of the bypass spring. The trailing portion of the bypass housing comprises at least one annular forward-facing seating surface. A leading portion of the bypass housing comprises a sealing extension, an intermediate reducing taper, and a valve plug sealing surface. The sealing extension of the leading portion is positioned between the forward-facing seating surface of the trailing portion and the intermediate reducing taper of the leading portion. The intermediate reducing taper of the leading portion is positioned between the sealing extension and the valve plug sealing surface of the leading portion and reduces towards the valve plug sealing surface of the leading portion.

In accordance with further embodiments of the present disclosure, fluid filters may be provided incorporating the modular relief valve assemblies contemplated herein.

Although the concepts of the present disclosure are described herein with primary reference to can-type oil filters, it is contemplated that the concepts will enjoy applicability to a variety of fluid filters where a relief valve is incorporated in the filter design. Contemplated filter types include, but are not limited to, oil, gas, alcohol, and water filters, multi-phase fluid filters, and/or the like.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
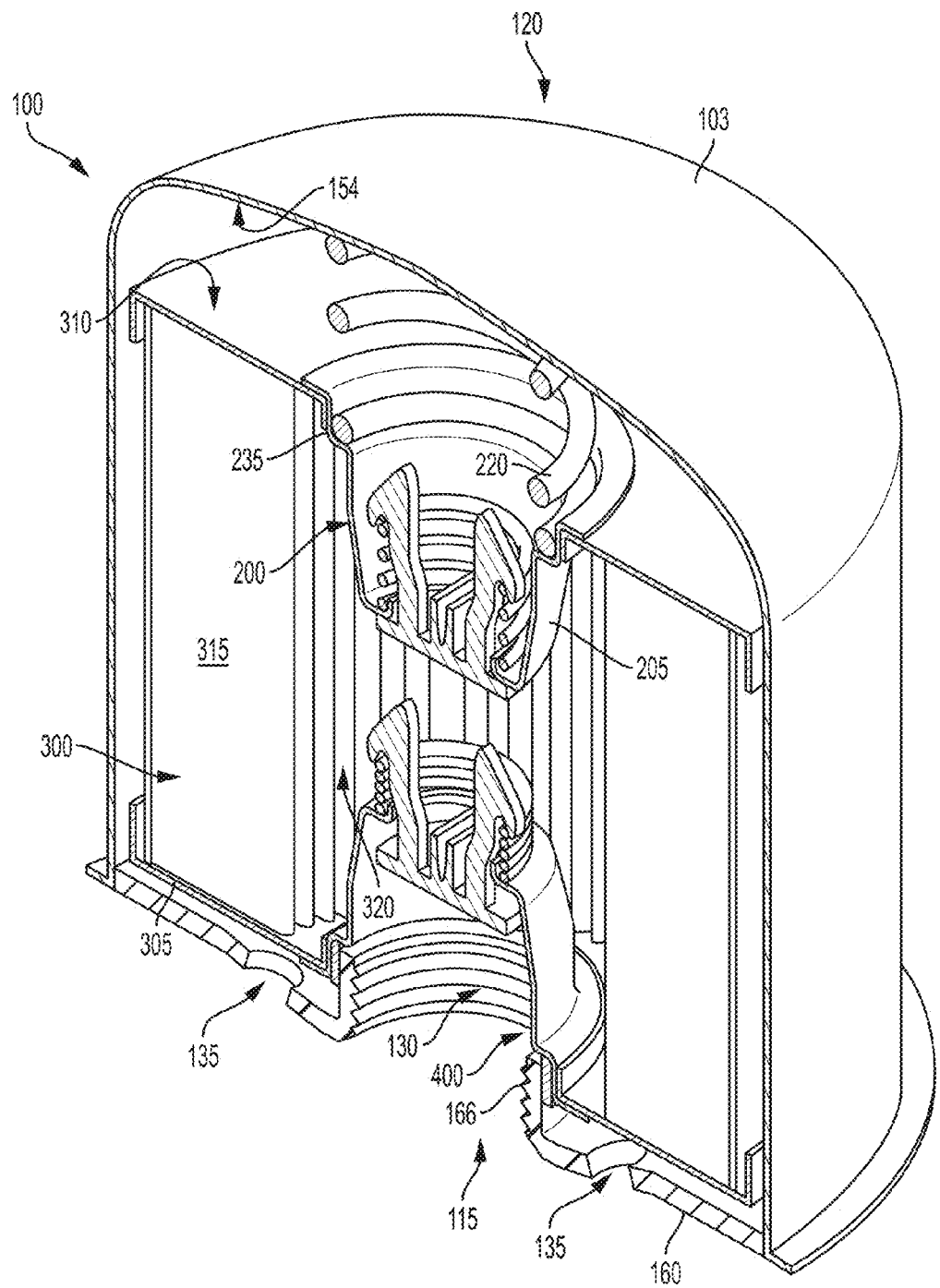
FIG. 1 depicts a sectional isometric view of an illustrative fluid filter according to one or more embodiments shown and described herein.
Figure 1:
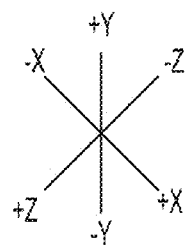

FIG. 1 depicts a sectional isometric view of a fluid filter, generally designated 100, according to one embodiment of the present disclosure. In the illustrated embodiment, the fluid filter 100 is configured as an oil filter but it is contemplated that fluid filters according to the present disclosure may be configured as any type of single or multi-phase fluid filter, e.g., a gasoline filter, a water filter, an alcohol filter, etc. The fluid filter 100 includes a filter canister 103, fluid inlets 135, a fluid outlet 130, filter media 300, and a relief valve assembly 200. In various embodiments, the relief valve assembly 200 and the filter media 300 are arranged in the filter canister 103 to form the fluid filter 100.

In various embodiments, the filter canister 103 is generally an outer portion of the fluid filter 100 and contains the other components of the fluid filter 100 therein. In some embodiments, the filter canister 103 is defined at least by a bypass end 120 and an outlet end 115. The bypass end 120 is located distally (i.e., towards the +y direction) of the filter canister 103. In contrast, the outlet end 115 is located proximally (i.e., towards the −y direction) of the filter canister 103.

The outlet end 115 of the filter canister 103 may include a mounting plate 160. The mounting plate 160 may be arranged such that the fluid filter 100 can be mounted or otherwise affixed to various apparatuses (not shown), such as, for example, one or more motor vehicle components, as described in greater detail herein. The particular configuration of the mounting plate 160 is beyond the scope of the present disclosure and may be gleaned from a variety of teachings in the art, such as, for example, U.S. Pat. Nos. 3,807,561, 6,893,560, and 8,187,458.

In some embodiments, the mounting plate 160 may contain a plurality of orifices therein, which may define the fluid inlet 135 and the fluid outlet 130. The fluid inlet 135 and the fluid outlet 130, respectively, are arranged such that fluid can flow therethrough. For example, fluid may flow into the fluid filter 100, particularly into the filter canister 103 via the fluid inlet 135. In some embodiments, the fluid inlet 135 is fluidly coupled to one or more portions of the fluid filter 100 such that fluid can flow into the one or more portions from the fluid inlet 135. Illustrative portions that are coupled to the fluid inlet 135 include, but are not limited to, a filtered fluid zone, an unfiltered fluid zone, one or more portions of the relief valve assembly 200, and one or more portions of the filter media 300, as described in greater detail herein. The fluid outlet 130 is generally aligned with an inner fluid passage 320 of the filter media 300, as described in greater detail herein. Thus, the fluid outlet 130 is fluidly coupled with the inner fluid passage 320 such that fluid flowing through the inner fluid passage 320 flows out of the fluid outlet 130.

In some embodiments, the fluid outlet 130 may include a centrally located threaded mounting orifice 166. In some embodiments, the threaded mounting orifice 166 may be centrally located with respect to the filter canister 103. That is, the threaded mounting orifice 166 may be located in a center portion of the mounting plate 160 of the filter canister 103. In some embodiments, the fluid inlet 135 may include a plurality of inlet orifices distributed peripherally about the threaded mounting orifice 166. The threaded mounting orifice 166 may include a threaded surface on an internal wall within the fluid outlet 130, which is threaded such that the fluid filter 100 can be attached to an apparatus, such as one or more portions of a motor vehicle, by screwing the fluid filter 100 onto the apparatus. Thus, the threaded mounting orifice 166 may correspond in shape, size, and configuration to a threaded surface of the one or more portions of the motor vehicle.

The filter canister 103 may further be any size or shape, particularly sizes and/or shapes suitable to contain the various other components of the fluid filter 100 therein. While the filter canister 103 is depicted as being generally cylindrical in shape, the filter canister 103 may include other shapes, such as rounded edges or irregular shapes and/or designs. In some embodiments, the filter canister 103 may be a substantially cylindrical filter canister 103 that is closed at one end by the bypass end 120 and at another end (e.g., the opposite end) by the mounting plate 160.

Figure 2:
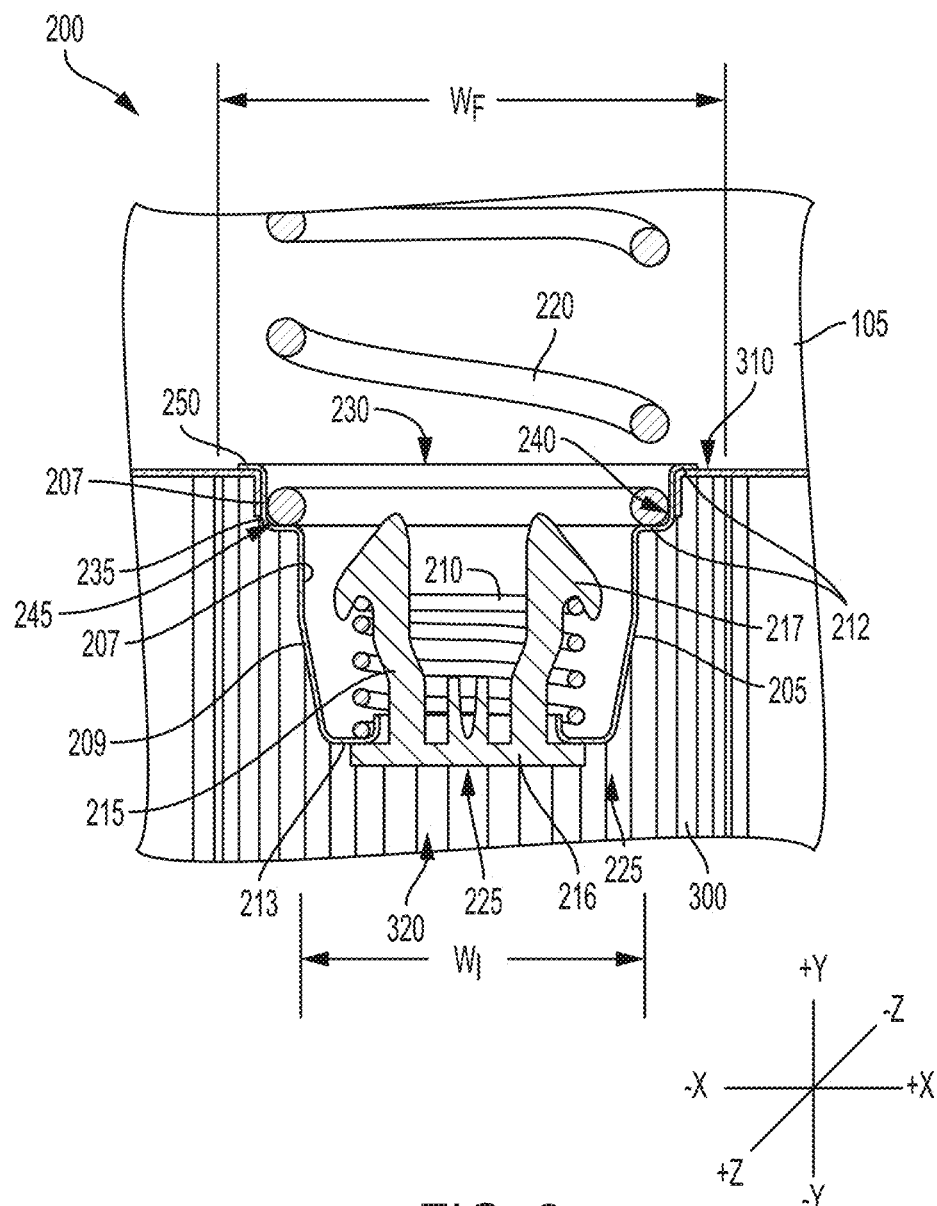
FIG. 2 depicts a sectional side view of an illustrative relief valve assembly according to one or more embodiments shown and described herein.
Figure 3:
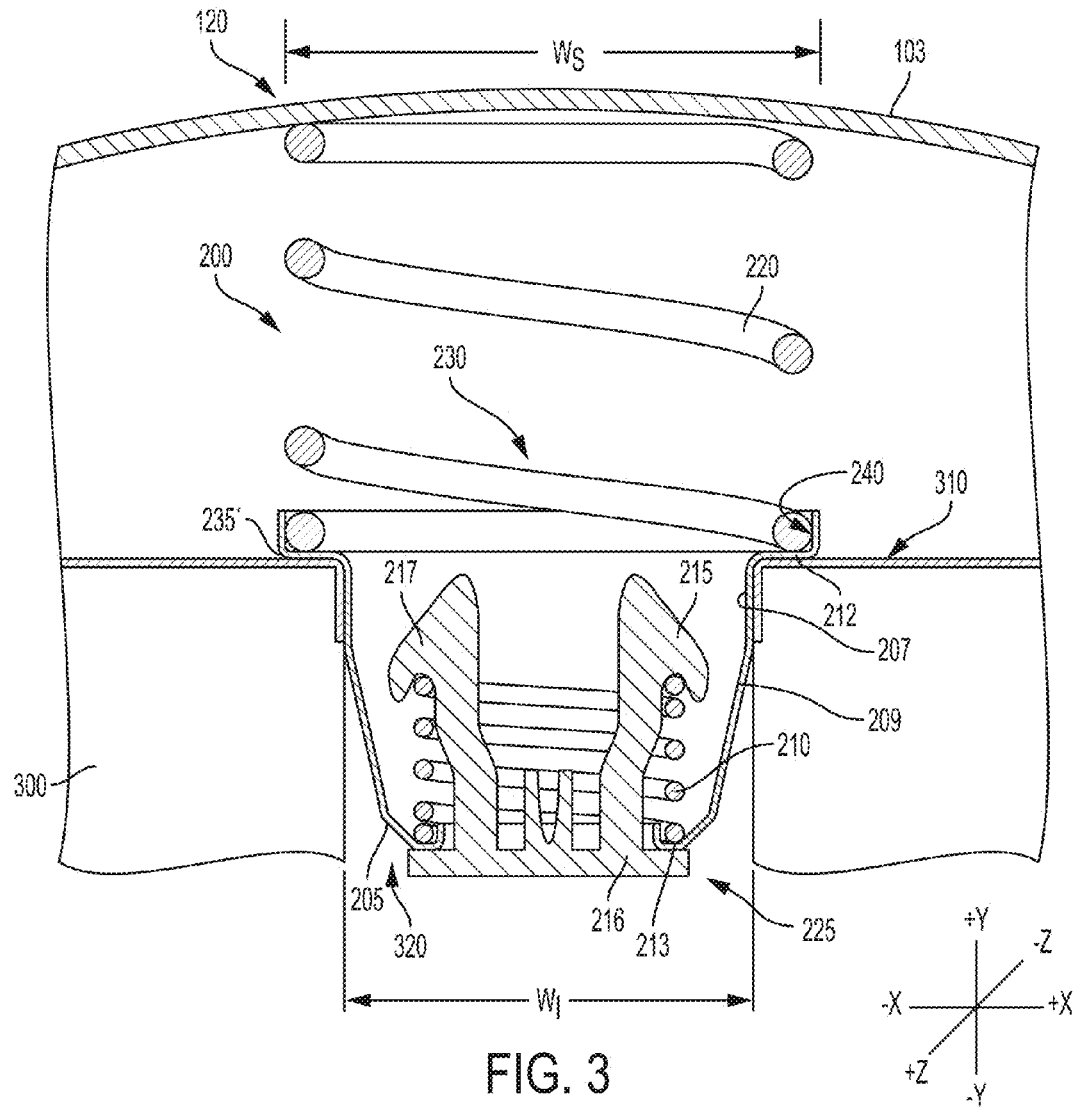
FIG. 3 depicts a sectional side view of an illustrative relief valve assembly in a closed position according to another embodiment shown and described herein.

Referring to FIG. 2, the relief valve assembly 200 is positioned inside the filter canister 103 and includes a bypass housing 205, a bypass spring 210, a valve plug 215, and a locator spring 220. The bypass housing 205 includes a leading portion 225 and a trailing portion 230. The leading portion 225 of the bypass housing 205 is proximally located (i.e., towards the −y direction). The leading portion 225 of the bypass housing 205 comprises a plurality of sealing extensions 207. The sealing extensions 207 may define progressively increasing diameters in the direction of the trailing portion 230 of the bypass housing 205 such that at least one of the sealing extensions 207 forcibly engages an inner cylindrical portion of the filter media 300 along the inner fluid passage 320 of the filter media 300. An intermediate reducing taper of the leading portion of the bypass housing may extend to the sealing surface 213 of the leading portion 225. The intermediate reducing taper 209 of the leading portion 225 may be, for example, a simple reducing taper (as depicted in FIG. 2) or a compound reducing taper (as depicted in FIG. 3). The intermediate reducing taper 209 of the leading portion 225 may comprise a compound reducing taper of incrementally decreasing slope as it approaches the sealing surface 213 of the leading portion 225.

In addition, the trailing portion 230 of the bypass housing 205 is distally located (i.e., towards the +y direction). The trailing portion 230 of the bypass housing 205 comprises a plurality of forward-facing seating surfaces 212 that define progressively reducing diameters in the direction of the leading portion of the bypass housing such that at least one of the forward-facing seating surfaces contacts the bypass end 310 of the filter media 300. Thus, when the relief valve assembly 200 is arranged in the fluid filter 100 (FIG. 1), the leading portion 225 of the bypass housing 205 extends into the inner fluid passage 320 of the filter media 300 from a bypass end 310 of the filter media 300, as described in greater detail herein.

Figure 4:
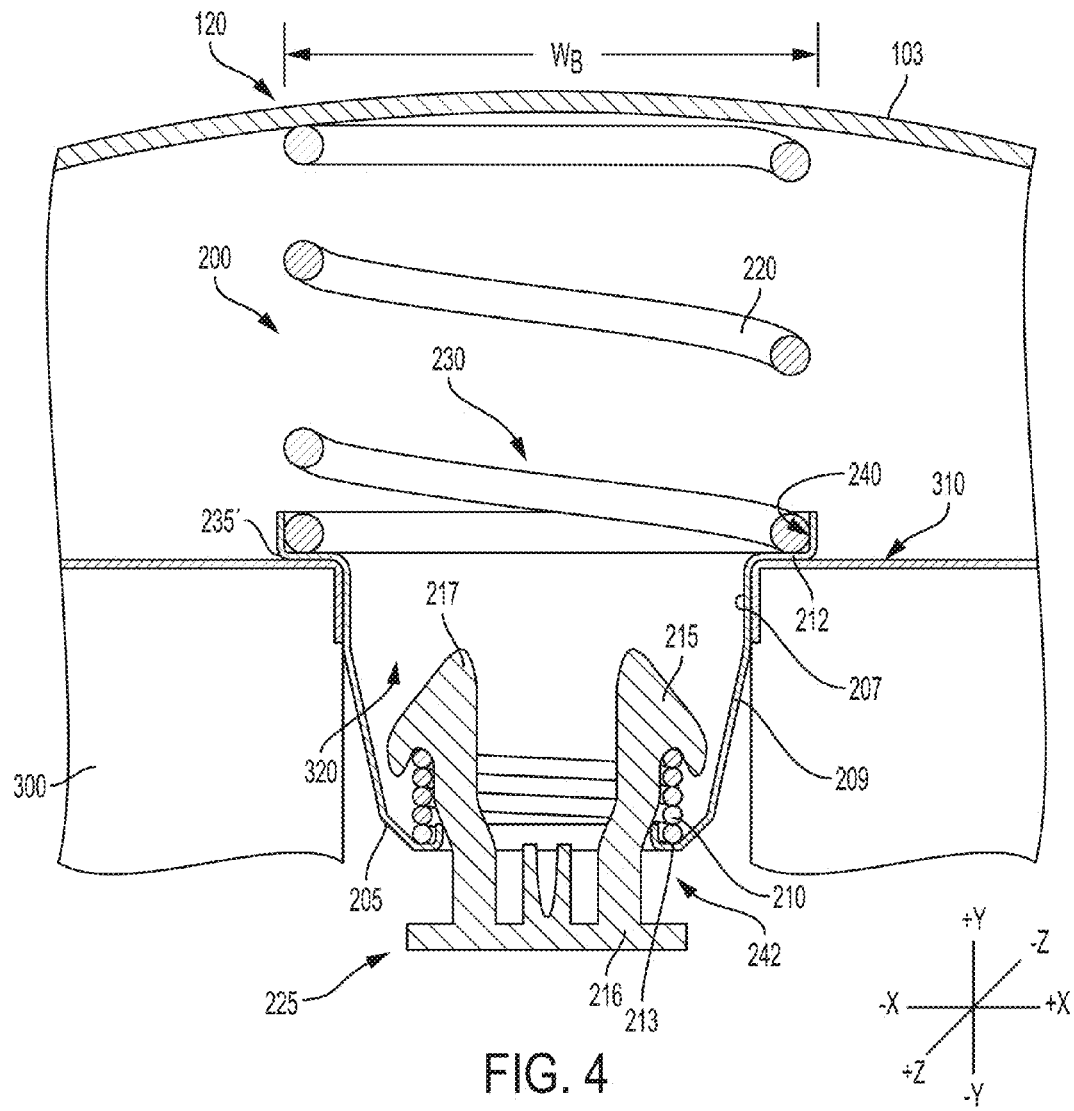
FIG. 4 depicts a sectional side view of the illustrative relief valve assembly of FIG. 3 in an open position.

In various embodiments, the trailing portion 230 of the bypass housing 205 is oversized relative to a cross sectional profile of the inner fluid passage 320 of the filter media 300 such that the trailing portion 230 does not extend into the inner fluid passage 320 of the filter media 300. In some embodiments, as shown in FIGS. 1 and 2, the trailing portion 230 of the bypass housing 205 may include a flange 250 positioned at a bypass end 310 of the filter media 300. The flange 250 may generally be oversized relative to the cross sectional profile of the inner fluid passage 320 of the filter media 300. That is, the flange 250 may have a width $W_F$ that is generally larger than a width $W_I$ of the cross sectional profile of the inner fluid passage 320 of the filter media 300. The trailing portion 230 of the bypass housing 205 may further include a circumferential shoulder 235. The circumferential shoulder 235 may extend laterally (e.g., in the +x/−x direction and/or in the +z/−z direction) from the flange 250 towards the inner fluid passage 320 of the filter media 300. In other embodiments, as shown in FIGS. 3 and 4, an alternative circumferential shoulder 235' may be positioned at the bypass end 310 of the filter media 300. The alternative circumferential shoulder 235' may be oversized relative to the cross sectional profile of the inner fluid passage 320 of the filter media 300 such that the alternative circumferential shoulder 235' does not extend towards the inner fluid passage 320. That is, the alternative circumferential shoulder 235' may have a width $W_S$ that is generally larger than a width $W_I$ of the cross sectional profile of the inner fluid passage 320 of the filter media 300. Such a sizing of the trailing portion 230 ensures that the bypass housing 205 does not fully enter into the inner fluid passage 320 when the fluid filter 100 is arranged. In addition, such a sizing of the trailing portion 230 may ensure a proper attachment with the locator spring 220, as described in greater detail herein. Such a sizing of the trailing portion 230 and the leading portion 225 of the bypass housing 205 may also result in the bypass housing 205 being a frustum shaped bypass housing 205 having a frustum-like shape.

Referring again to FIG. 2, in various embodiments, the trailing portion 230 of the bypass housing 205 may include a circumferential sealing portion 245 that, when the relief valve assembly 200 is arranged in the fluid filter 100 (FIG. 1), engages the bypass end 310 of the filter media 300. Accordingly, the circumferential sealing portion 245 may form a seal between the bypass housing 205 and the filter media 300.

Referring to FIG. 4, the leading portion 225 of the bypass housing 205 comprises a proximal opening 242. Such a proximal opening 242 provides a space for fluid to flow through when the valve plug 215 is in an open position, as described in greater detail herein. The proximal opening 242 may generally be any shape and/or size, particularly shapes and/or sizes suitable for receiving the valve plug 215.

Referring to FIGS. 2-4, the bypass spring 210 and/or the valve plug 215 are mechanically coupled to the bypass housing 205. Thus, the bypass spring 210 is mounted within the bypass housing 205. In some embodiments, the valve plug 215 may be mechanically coupled to the bypass housing 205 via the bypass spring 210. For example, the valve plug 215 may be partially located within the bypass spring 210 such that the bypass spring 210 surrounds at least a portion of the valve plug 215. In such an example, the valve plug 215 may include a head portion 216 coupled to a tail portion 217. The head portion 216 of the valve plug 215 may be located externally to the bypass spring 210 such that the head portion 216 abuts the bypass spring 210. The tail portion 217 of the valve plug 215 may extend through a center of the bypass spring 210. In addition, the head portion 216 of the valve plug 215 may extend through the proximal opening 242 in the bypass housing 205. Thus, compression and decompression of the bypass spring 210 causes movement of the valve plug 215 in the +y/−y direction to cover and uncover the proximal opening 242 in the bypass housing 205. Particularly, as shown in FIG. 3, when the bypass spring 210 is decompressed, it biases the valve plug 215 in a closed position (i.e., towards the +y direction) such that the head portion 216 of the valve plug 215 presses against the bypass housing 205, thereby sealing the proximal opening 242 in the leading portion 225 of the bypass housing 205. The valve plug 215 may generally be biased in the closed position by the bypass spring 210 when a bypass fluid pressure on the valve plug 215 is less than or equal to a bypass threshold of the bypass spring 210. As shown in FIG. 4, the valve plug 215 moves into an open position (i.e., towards the −y direction) such that the head portion 216 of the valve plug 215 separates from the bypass housing 205, thereby providing a space for fluid to flow through the proximal opening 242 in the leading portion 225 of the bypass housing 205. The valve plug 215 generally moves into the open position by a force that causes the bypass spring 210 to compress. For example, in some embodiments, the valve plug 215 may move into the open position when the bypass fluid pressure in the bypass housing 205 exceeds the bypass threshold of the bypass spring 210. As such, the bypass fluid pressure may cause the bypass spring 210 to compress. The bypass threshold of the bypass spring 210 is not limited by this disclosure, and may generally be any suitable threshold for initiating bypass flow. In some embodiments, the bypass threshold may correspond to a maximum pressure for inside the fluid filter 100 so as to avoid damage to the fluid filter 100 and/or various components thereof.

Referring again to FIGS. 2-4, the locator spring 220 may generally be arranged such that it locates the relief valve assembly 200 in the fluid filter 100 (FIG. 1), thereby maintaining an appropriate configuration and preventing leakage or disengagement of the relief valve assembly 200 from the filter media 300. Such a configuration may be maintained because the locator spring 220 is joined to the bypass housing 205 and is compressed between the bypass housing 205 and the bypass end 120 of the filter canister 103. In particular embodiments, the locator spring 220 is joined to the trailing portion 230 of the bypass housing 205. For example, the locator spring 220 may be clenched within the circumferential shoulder 235, 235' of the bypass housing 205. That is, the circumferential shoulder 235, 235' may be shaped and sized to receive the locator spring 220 such that the locator spring 220 fits tightly within the circumferential shoulder 235, 235'. In addition, the circumferential shoulder 235, 235' causes a pressure to be applied to the locator spring 220 to maintain the location of the locator spring 220 within the circumferential shoulder 235 such that it does not become dislodged or otherwise disconnected from the bypass housing 205. In some embodiments, the locator spring 220 may be press-fit against the internal face 240 of the bypass housing 205. That is, the bypass housing 205 may be shaped and sized so as to receive the locator spring 220 against the internal face 240. Such a configuration may be similar to that of the circumferential shoulder 235 in that the locator spring 220 fits tightly within the internal face 240. In addition, the internal face 240 may cause a pressure to be applied to the locator spring 220 to maintain the location of the locator spring 220 within the bypass housing 205 such that it does not become dislodged or otherwise disconnected from the bypass housing 205. The relief valve assembly 200 is "modular" in the sense that it embodies a collection of subcomponents assembled as a unitary structure that maintains its unitary configuration without dependence upon other filter hardware, supplemental handling hardware, or other handling equipment. In this manner, the modular relief valve assembly 200 may be conveniently installed in and removed from the fluid filter 100, or swapped with similar relief valve assemblies without creating complications that would otherwise arise if the modular relief valve assembly 200 were dependent on filter hardware, supplemental handling hardware, or other handling equipment to maintain a unitary configuration. Relief valve assembly components, such as the locator spring 220 and the bypass housing 205, for example, may be modularly joined through a press-fit interface, bonding, welding, soldering, crimping, or any other suitable way of joining components in a modular construction.

Referring also to FIG. 1, it is noted that the locator spring 220 is generally free to move laterally (e.g., in the +x/−x direction and/or in the +z/−z direction) relative to a compression axis of the spring 220 along an internal face 154 of the bypass end 120 of the filter canister 103. This free movement may allow the locator spring 220 to slip into place with respect to the bypass housing 205 when the fluid filter 100 is assembled, thereby ensuring the locator spring 220 maintains an appropriate orientation and preventing leakage or disengagement of the relief valve assembly 200 from the filter media 300. It is noted that this freedom of movement with respect to the internal face 154 of the bypass end 120 of the filter canister 103 allows the locator spring 220 to locate itself with respect to the filter canister 103 and be used with a variety of filter canister sizes, shapes, and/or the like. Moreover, such an arrangement of the locator spring 220 with respect to the bypass housing 205 may further allow the locator spring 220 to function as an aftermarket component that is attached to existing bypass housing components.

Compression of the locator spring 220 between the bypass housing 205 and the bypass end 120 of the filter canister 103 is such that the trailing portion 230 of the bypass housing 205 forcibly engages the bypass end 310 of the filter media 300. In addition, compression of the locator spring 220 between the bypass housing 205 and the bypass end 120 of the filter canister 103 is such that a seated end 305 of the filter media 300 forcibly engages the outlet end 115 of the filter canister 103. Accordingly, the filter media 300 is compressed between the outlet end 115 of the filter canister 103 and the bypass housing 205.

Referring to FIGS. 1-4, the filter canister 103, the fluid inlet 135, the fluid outlet 130, and the filter media 300 may define an unfiltered fluid zone and a filtered fluid zone within the filter canister 103. Fluid may generally pass between the unfiltered fluid zone and the filtered fluid zone via the valve plug 215 (FIGS. 2-4) when the valve plug 215 is in an open position, as depicted in FIG. 4 and described in greater detail herein. Accordingly, the valve plug 215 (FIGS. 2-4) may define a fluid partition between the unfiltered fluid zone and the filtered fluid zone of the filter canister 103. When fluid flows between the unfiltered fluid zone and the filtered fluid zone via the relief valve assembly 200, it may generally bypass the filter media 300. Such a bypass may be necessary, for example, when the filter media 300 is clogged or when the viscosity of the fluid exceeds a viscosity threshold of the filter media 300. Accordingly, the function of relief valve assembly 200 may ensure that fluid continues to flow through the fluid outlet 130 even in instances where the filter media 300 is clogged and/or the fluid has a high viscosity.

At least a portion of the relief valve assembly 200, particularly the bypass housing 205, may generally be comprised of any material, particularly materials suitable to retain fluids and/or pressurized fluids, as described herein. In some embodiments, the bypass housing 205 may be made of tin plate steel, such as a tin plate steel material having a thickness of about 0.010 inches.

It is noted that the particular valve plug 215 described herein is merely presented for illustrative purposes and it is contemplated that other valve plug configurations may be used without departing from the scope of the present disclosure. For example, and not by way of limitation, suitable valve plug configurations are shown and described in U.S. Patent Publication No. 2014/0251465, filed on May 16, 2014, and entitled "Tip-Resistant Valve Plugs".

As shown in FIG. 1, in various embodiments, the fluid filter 100 may further include a backflow valve assembly 400. The backflow valve assembly 400 may be structurally similar to the relief valve assembly 200. Thus, the backflow valve assembly 400 may include at least a housing, a spring, and a valve plug similar to the components described herein with respect to the relief valve assembly 200. In some embodiments, the backflow valve assembly 400 may be disposed in a fluid path between the inner fluid passage 320 of the filter media 300 and the fluid outlet 130. For example, the backflow valve assembly 400 may be positioned at the seated end 305 of the filter media 300. Accordingly, the backflow valve assembly 400 may be fluidly coupled to the inner fluid passage 320 of the filter media 300 and the fluid outlet 130 such that fluid may flow from the inner fluid passage 320 through the backflow valve assembly 400 to the fluid outlet 130.

In some embodiments, the locator spring 220 is at least partially seated within and modularly joined to the trailing portion 230 of the bypass housing 205. The bypass spring 210 and the valve plug 215 may be modularly joined to the bypass housing 205 and configured such that the valve plug 215 moves to an open position when a bypass fluid pressure on the valve plug 215 exceeds a bypass threshold of the bypass spring 210. The trailing portion 230 of the bypass housing 205 may comprise one or more annular forward-facing seating surfaces 212 in contact with the bypass end 310 of the filter media 300. The leading portion 225 of the bypass housing 205 extends into the inner fluid passage 320 of the filter media 300 from the bypass end 310 of the filter media 300. The leading portion 225 may include a sealing extension 207, an intermediate reducing taper 209, and a valve plug sealing surface 213.

The sealing extension 207 of the leading portion 225 may be positioned between the forward-facing seating surface 212 of the trailing portion 230 and the intermediate reducing taper 209 of the leading portion 225. The intermediate reducing taper 209 of the leading portion 225 may be positioned between the sealing extension 207 and the valve plug sealing surface 213 of the leading portion 225 and reduce towards the valve plug sealing surface 213 of the leading portion 225. The locator spring 220 may be compressed between the bypass housing 205 and the bypass end 310 of the filter canister 103. Given the configuration of the bypass housing 205 and the filter media 300, the trailing portion 230 of the bypass housing 205 may forcibly engage the bypass end 310 of the filter media 300. Accordingly, an outer cylindrical portion of the sealing extension 207 may forcibly engage an inner cylindrical portion of the filter media 300 along the inner fluid passage 320 of the filter media. The seated end 305 of the filter media 300 may therefore forcibly engage the outlet end 115 of the filter canister 103.

In some embodiments, the backflow valve assembly 400 may be arranged such that it is open under normal flow conditions (i.e., substantially no fluid is backflowing from the fluid outlet 130). Such an open position may allow fluid to pass from the inner fluid passage 320 of the filter media 300 through the backflow valve assembly 400 to the fluid outlet 130. When fluid backflows into the fluid outlet 130, an increased backflow fluid pressure against the valve plug from the fluid may cause the backflow valve assembly 400 to close and prevent fluid flow therethrough.

Referring again to FIG. 1, the filter media 300 defines a seated end 305, a bypass end 310, an outer filtering zone 315, and an inner fluid passage 320 extending from the seated end 305 to the bypass end 310 of the filter media 300. Thus, when the filter media 300 is placed within the filter canister 103 as described herein, the seated end 305 generally faces the outlet end 115 of the filter canister 103, the bypass end 310 generally faces the bypass end 120 of the filter canister 103, and the outer filtering zone 315 generally extends from the seated end 305 to the bypass end 310 of the filter media 300 and surrounds the inner fluid passage 320. In addition, the filter media 300 may be generally sized and shaped to correspond to the size and/or shape of the filter canister 103. Thus, in embodiments where the filter canister 103 is a substantially cylindrical filter canister 103, the filter media 300 may have a cylindrical filter media profile that corresponds to the shape and size of the filter canister 103.

The filter media 300 is disposed in a fluid path 155 within the filter canister 103 between the peripherally distributed inlet orifices and the fluid outlet 130 of the fluid filter 100 such that the fluid outlet 130 is aligned with the inner fluid passage 320 of the filter media 300. Thus, the inner fluid passage 320 of the filter media 300 is fluidly coupled to fluid inlet 135 and/or fluidly coupled to the fluid outlet 130. Accordingly, it may be recognized that such a configuration may allow fluid to flow in the fluid inlet 135, through the inner fluid passage 320 of the filter media 300, and out the fluid outlet 130.

The composition and/or structure of the filter media 300, other than as described herein, is not limited by this disclosure. Thus, the filter media 300 may generally be any filter media now known or later developed, particularly filter media configured to filter fluids, fluid-like compositions, multi-phase fluids, and/or the like. Illustrative fluids may include, but are not limited to, oil, gasoline, water, alcohol, or combinations thereof. In some embodiments, the filter media 300 may be compositionally and structurally configured to remove particulates from motor oil. For example, the filter media 300 may include a substrate that includes alumina, activated clay, cellulose, a cement binder, silica-alumina, polymer matrices, activated carbon, or combinations thereof. In some embodiments, the filter media 300 may be compositionally and structurally configured to react chemically with one or more components of motor oil, gasoline, water, alcohol, or combinations thereof. For example, the filter media 300 may include barium oxide (BaO), calcium carbonate ($CaCO_3$), calcium oxide (CaO), calcium hydroxide ($Ca(OH)_2$), magnesium carbonate ($MgCO_3$), magnesium hydroxide ($Mg(OH)_2$), magnesium oxide (MgO), sodium aluminate ($NaAlO_2$), sodium carbonate ($Na_2CO_3$), sodium hydroxide (NaOH), zinc oxide (ZnO), or combinations thereof. In another example, the filter media 300 may include a hydroperoxide decomposing component selected from molybdenum disulfide ($MoS_2$), $Mo_4S_4$ ($ROCS_2)_6$, sodium hydroxide (NaOH), or combinations thereof. In some embodiments, the filter media 300 may include a physical adsorption component that is compositionally and structurally configured to adsorb components of motor oil, gasoline, water, alcohol, or combinations thereof. In another embodiment, the filter media 300 may include porous paper, glass fibers, spun polymer filaments, or combinations thereof for passive removal of one or more particulate components from the fluid. Such compositions and structures may generally be incorporated in any portion of the filter media 300, such as, for example, the outer filtering zone 315.

It is also noted that recitations herein of "at least one" component, element, etc., should not be used to create an inference that the alternative use of the articles "a" or "an" should be limited to a single component, element, etc. For example, reference herein to "an inner fluid passage" contemplates both a single inner fluid passage and a plurality of fluid passages.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present invention it is noted that the terms "substantially" and "approximately" are utilized herein to represent the inherent degree of uncertainty that may be attributed to any quantitative comparison, value, measurement, or other representation. For example, a "substantially cylindrical filter canister" may refer to a filter canister that is generally cylindrical in shape, but may contain additional components that prevent the canister from being an exact cylinder. The terms "substantially" and "approximately" are also utilized herein to represent the degree by which a quantitative representation may vary from a stated reference without resulting in a change in the basic function of the subject matter at issue. For example, an orifice that is substantially centrally located on a mounting plate may be generally at or near a central portion of the mounting plate, but will retain its basic function regardless of the location with respect to the true central portion of the mounting plate.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

The invention claimed is:

1. A fluid filter comprising a filter canister, a fluid inlet, a fluid outlet, filter media, and a modular relief valve assembly, wherein:
the filter media defines a seated end, a bypass end, an outer filtering zone, and an inner fluid passage;
the inner fluid passage of the filter media extends from the seated end to the bypass end of the filter media;
the filter media is disposed in a fluid path within the filter canister between the fluid inlet and the fluid outlet;
the modular relief valve assembly is positioned inside the filter canister and comprises a bypass housing, a bypass spring, a valve plug, and a locator spring;
the locator spring is at least partially seated within and modularly joined to a trailing portion of the bypass housing;
the bypass spring and the valve plug are modularly joined to the bypass housing and are configured such that the valve plug moves to an open position when a bypass fluid pressure on the valve plug exceeds a bypass threshold of the bypass spring;
the trailing portion of the bypass housing comprises at least one annular forward-facing seating surface in contact with the bypass end of the filter media;

a leading portion of the bypass housing extends into the inner fluid passage of the filter media from the bypass end of the filter media and comprises a sealing extension, an intermediate reducing taper, and a valve plug sealing surface;

the sealing extension of the leading portion is positioned between the forward-facing seating surface of the trailing portion and the intermediate reducing taper of the leading portion;

the intermediate reducing taper of the leading portion is positioned between the sealing extension and the valve plug sealing surface of the leading portion and reduces towards the valve plug sealing surface of the leading portion; and the locator spring is compressed between the bypass housing and a bypass end of the filter canister such that, given the configuration of the bypass housing and the filter media, the trailing portion of the bypass housing forcibly engages the bypass end of the filter media, an outer cylindrical portion of the sealing extension forcibly engages an inner cylindrical portion of the filter media along the inner fluid passage of the filter media, and the seated end of the filter media forcibly engages an outlet end of the filter canister.

2. The fluid filter of claim 1, wherein:
the leading portion of the bypass housing comprises a plurality of sealing extensions; and
the sealing extensions define progressively increasing diameters in a direction of the trailing portion of the bypass housing such that at least one of the sealing extensions forcibly engages an inner cylindrical portion of the filter media along the inner fluid passage of the filter media.

3. The fluid filter of claim 1, wherein the intermediate reducing taper of the leading portion of the bypass housing extends to the sealing surface of the leading portion.

4. The fluid filter of claim 1, wherein the intermediate reducing taper of the leading portion comprises a simple reducing taper or a compound reducing taper.

5. The fluid filter of claim 4, wherein the intermediate reducing taper of the leading portion comprises a compound reducing taper of incrementally decreasing slope as it approaches the sealing surface of the leading portion.

6. The fluid filter of claim 1, wherein the leading portion of the bypass housing is frustum shaped.

7. The fluid filter of claim 1, wherein the trailing portion of the bypass housing comprises a plurality of forward-facing seating surfaces that define progressively reducing diameters in a direction of the leading portion of the bypass housing such that at least one of the forward-facing seating surfaces contacts the bypass end of the filter media.

8. The fluid filter of claim 1, wherein the trailing portion of the bypass housing comprises a circumferential sealing portion that engages the bypass end of the filter media.

9. The fluid filter of claim 1, wherein at least a portion of the trailing portion of the bypass housing is oversized relative to a cross sectional profile of the inner fluid passage of the filter media and does not extend into the inner fluid passage of the filter media.

10. The fluid filter of claim 1, wherein the trailing portion of the bypass housing comprises:
a flange positioned at the bypass end of the filter media; and
a circumferential shoulder that extends from the flange towards the inner fluid passage of the filter media.

11. The fluid filter of claim 10, wherein the flange is oversized relative to a cross sectional profile of the inner fluid passage of the filter media and does not extend into the inner fluid passage of the filter media.

12. The fluid filter of claim 1, wherein the locator spring is modularly joined to the trailing portion of the bypass housing.

13. The fluid filter of claim 1, wherein the locator spring is clenched within a circumferential shoulder of the bypass housing.

14. The fluid filter of claim 1, wherein the locator spring is press-fit against an internal face of the bypass housing.

15. The fluid filter of claim 1, wherein the locator spring is free to move laterally, relative to a compression axis of the locator spring, along an internal face of the bypass end of the filter canister.

16. The fluid filter of claim 1, wherein:
the fluid inlet comprises a plurality of inlet orifices distributed peripherally about the fluid outlet; and
the fluid outlet is aligned with the inner fluid passage of the filter media.

17. The fluid filter of claim 1, wherein:
the filter canister, the fluid inlet, the fluid outlet, and the filter media define an unfiltered fluid zone and a filtered fluid zone within the filter canister; and
the valve plug of the relief valve assembly defines a fluid partition between the unfiltered fluid zone and the filtered fluid zone of the filter canister.

18. The fluid filter of claim 1, wherein the bypass spring and the valve plug are mechanically coupled to the bypass housing of the relief valve assembly and are configured such that the valve plug is biased in a closed position by the bypass spring when the bypass fluid pressure on the valve plug is less than or equal to a bypass threshold of the bypass spring.

19. The fluid filter of claim 1, wherein the valve plug comprises a head portion coupled to a tail portion, wherein the head portion abuts the bypass spring and the tail portion extends through a center of the bypass spring.

20. The fluid filter of claim 1, wherein:
the fluid filter further comprises a backflow valve assembly disposed in a fluid path between the inner fluid passage of the filter media and the fluid outlet; and
the backflow valve assembly is in an open position under normal flow conditions and is in a closed position when a fluid backflows into the fluid outlet.

21. The fluid filter of claim 1, wherein the outlet end of filter canister comprises a mounting plate and the fluid inlet and fluid outlet are defined by orifices in the mounting plate.

22. The fluid filter of claim 21, wherein:
the fluid outlet comprises a centrally located threaded mounting orifice; and
the fluid inlet comprises a plurality of inlet orifices distributed peripherally about the threaded mounting orifice.

23. A modular relief valve assembly comprising a bypass housing, a bypass spring, a valve plug, and a locator spring, wherein:
the locator spring is at least partially seated within and modularly joined to a trailing portion of the bypass housing;
the bypass spring and the valve plug are modularly joined to the bypass housing and are configured such that the valve plug moves to an open position when a bypass fluid pressure on the valve plug exceeds a bypass threshold of the bypass spring;

the trailing portion of the bypass housing comprises at least one annular forward-facing seating surface;

a leading portion of the bypass housing comprises a sealing extension, an intermediate reducing taper, and a valve plug sealing surface;

the sealing extension of the leading portion is positioned between the forward-facing seating surface of the trailing portion and the intermediate reducing taper of the leading portion;

the intermediate reducing taper of the leading portion is positioned between the sealing extension and the valve plug sealing surface of the leading portion and reduces towards the valve plug sealing surface of the leading portion.

24. A fluid filter comprising the modular relief valve assembly of claim 23.

\* \* \* \* \*